Jan. 13, 1931.  A. ANDREWS  1,788,609
MECHANICAL MOVEMENT
Filed Oct. 7, 1929  2 Sheets-Sheet 1
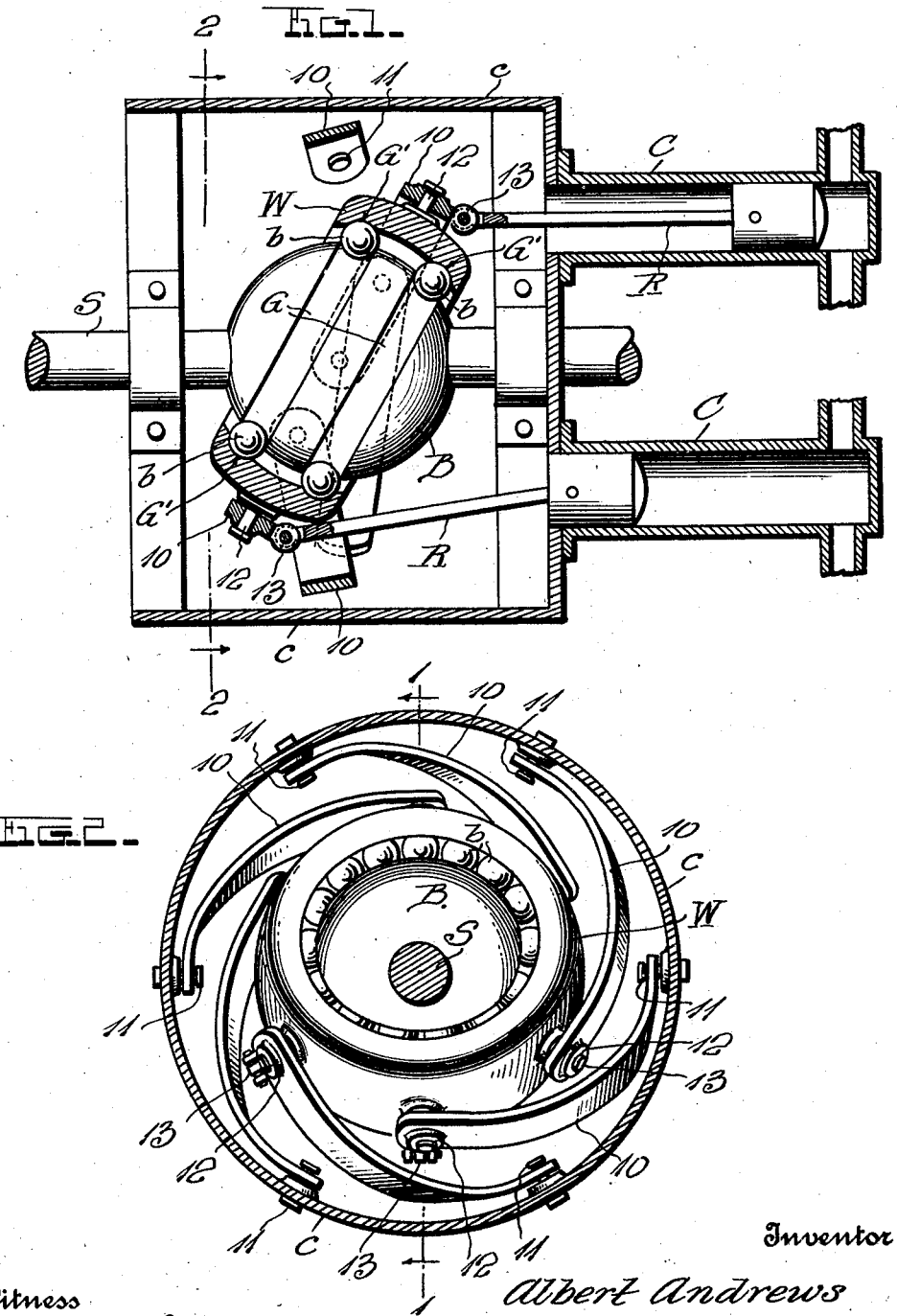
Witness
H. Woodard
Inventor
Albert Andrews
By H. R. Wilson & Co.
Attorneys Jan. 13, 1931.   A. ANDREWS   1,788,609
MECHANICAL MOVEMENT
Filed Oct. 7, 1929   2 Sheets-Sheet 2
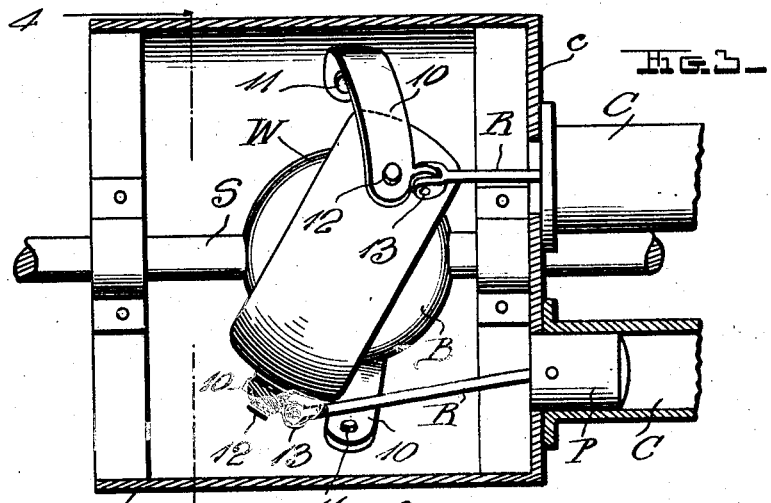
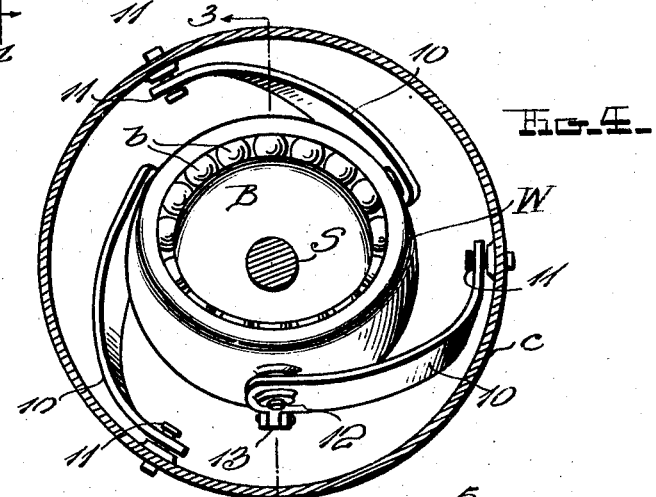
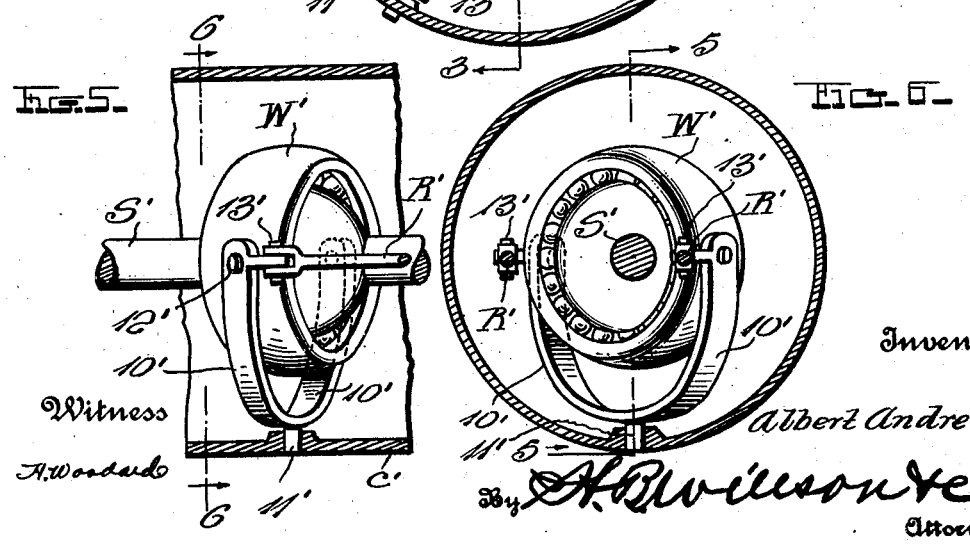
Inventor
Albert Andrews Patented Jan. 13, 1931

1,788,609

UNITED STATES PATENT OFFICE

ALBERT ANDREWS, OF DEADWOOD, SOUTH DAKOTA

MECHANICAL MOVEMENT

Application filed October 7, 1929. Serial No. 397,952.

The invention relates to mechanical movements for converting either reciprocatory or oscillatory motion, into rotary motion, or vice versa, and it has reference to a specific type of motion converting means in which a rotary shaft and a wobbler are operatively connected and in which a movable member either actuates or is actuated by the wobbler, said movable member being often the piston of an engine or a compressor. It is customary in mechanical movements of this type to connect the wobbler with a stationary member by a link, yoke or the like and it is also common practice to connect the movable member directly with the wobbler. When connecting this member with the wobbler, either a ball joint or some type of universal joint is necessary to allow the required relative movements, and as it is practically impossible to keep such joints tight, engines and compressors embodying this construction have been prone to knock and vibrate excessively. It is the principal object of my invention to overcome this difficulty by the use of a novel construction in which the movable member above mentioned, is connected not directly with the wobbler but directly to a link, which link in turn prevents rotation of said wobbler with the shaft, and the arrangement is such that all pivots required may be of single-axis nature, so that conventional bearings may be used and no ball joints or universals are necessary. Moreover, the improved construction is of manufacturing advantage, as part of the pivotal connection between the movable member and the pivoted link, is carried by this link and hence may be more readily machined than if carried by the relatively large wobbler.

The link is usually pivoted at the periphery of the wobbler and hence by pivoting the movable member to this link rather than to the wobbler, said member is spaced more distantly from the shaft and hence a long stroke may be imparted to said member without using an excessively large wobbler.

With the foregoing in view, the invention resides in the novel subject matter hereinafter described and claimed, description being accomplished by reference to the accompanying drawings.

Fig. 1 is a vertical sectional view of the invention in connection with six cylinders and pistons of an engine or compressor, and a twelve cylinder machine could be produced by duplicating the pistons, rods and pivots shown at the right of Fig. 1 upon the left thereof. This view is cut on the plane indicated by line 1—1 of Fig. 2.

Fig. 2 is a vertical transverse sectional view on line 2—2 of Fig. 1.

Fig. 3 is a view similar to Fig. 1 but showing the construction used in connection with a three cylinder engine or compressor, and by duplicating the cylinders, rods and pivots shown at the right of this view, at the left thereof, a six cylinder opposed machine may be produced. This view is cut substantially on the plane indicated by line 3—3 of Fig. 4.

Fig. 4 is a transverse sectional view on line 4—4 of Fig. 3.

Fig. 5 is a view similar to Fig. 3 but illustrating a construction which may be employed with a two cylinder machine or with slight change, with a four cylinder opposed machine. This view is cut as indicated by line 5—5 of Fig. 6.

Fig. 6 is a transverse sectional view on line 6—6 of Fig. 5.

The two forms of construction illustrated in Figs. 1 and 2 and in Figs. 3 and 4 respectively, possess a number of features in common, the only differences being in the number of cylinders C, pistons P, piston rods R and associated pivots. Hence, one description with the reference characters applied to both forms of construction, will suffice.

W denotes a wobbler and S has reference to a shaft which either operates said wobbler or is driven by the latter, according to the nature of the machine with which the mechanical movement is used. The wobbler and shaft are operatively connected in any preferred manner. In the construction shown, a ball B is secured upon the shaft S and is provided with oblique peripheral grooves G disposed opposite similar grooves G' in the wobbler W, ball bearings $b$ being engaged with the two sets of grooves. When this or a similar construction is employed, the wobbler W is necessarily of annular form, but it is of course possible to provide a construction in which the wobbler would not be in the form of a ring, such variation being simply one of mechanical skill rather than invention.

Links 10 equal in number to the rods R (or other movable members used in place of these rods) are disposed around the periphery of the wobbler W, being perferably encased in a non-rotatable support or casing c which may well be the "crank case" of a compressor or engine. Pivots having certain definite relation with other parts, are employed at the inner and outer ends of the links 10, and as the relation of any link with its pivots in identical with the relation of other links and their pivots, one description will suffice.

A single-axis pivot 11 connects the outer end of the link 10 with the support c, the axis of said pivot 11 being perpendicular to the shaft S. A second single-axis pivot 12 connects the inner end of the link 10 with the periphery of the wobbler W, the axis of said pivot 12 being perpendicular to the axis A of the wobbler W. A third single-axis pivot 13 connects the inner end of the link 10 with the piston rod R, the axis of said pivot 13 being parallel with the axis of the pivot 11.

By having the pivots 11 and 12 at right angles to each other, the former perpendicular to the shaft S and the pivot 12 perpendicular to the axis A of the wobbler W, the necessary relative movements of wobbler and link will take place without any binding of pivots. Hence, the necessity of using ball joints or the like in place of single-axis pivots, is overcome. Moreover, as the axis of the pivot 13 is parallel with the axis of the pivot 11 about which the link 10 swings, there will be no binding of said pivot 13, even though it be of single-axis nature instead of in the form of a ball or universal joint. A construction is thus produced which may not only be manufactured more easily than conventional structures, but will be more advantageous in use, from numerous standpoints.

In addition to the advantages which will already be apparent, attention may be invited to the fact that by pivoting the rods R to the links 10 instead of to the wobbler W, said rods are spaced more distantly from the shaft S. Consequently, an unusually long stroke may be obtained with a wobbler much smaller than would ordinarily be necessary to obtain such a stroke.

In Figs. 5 and 6, the wobbler W' and shaft S' correspond to the wobbler W and shaft S and they are operatively connected in the same or a similar manner. Only two rods R' are shown and they are pivoted at 13' to the ends of a U-shaped yoke, which ends virtually constitute two links 10'. A single pivot 11' connects the central portion of the U-shaped yoke with the support c', while pivots 12' connect the ends of the yoke with the periphery of the wobbler W'. All of the pivots 11', 12' and 13' are of single-axis form. Pivot 11' is perpendicular to the axis of shaft S; each pivot 12' is perpendicular to the axis of the wobbler W', each pivot 13' is parallel with the pivot 11', and the axis of this pivot 11' is at right angles to the axis of either of the pivots 12'. Hence, here again, even with single-axis pivots rather than with ball joints or universal joints, there will be no binding of pivots.

Within the scope of the invention as claimed, numerous variations may be made and it is to be understood that the present disclosure is for illustrative purposes only, as numerous refinements of mechanical skill nature are of course required to produce a really practicable machine embodying the invention. Production of such a machine however embodying the improvements herein defined, will result in advantages not heretofore attainable.

I claim:—

1. A mechanical movement comprising a wobbler, a non-rotatable support outwardly spaced therefrom, a link extending from said wobbler to said support, a single-axis pivot connecting said link with said support, a second single-axis pivot having its axis at right angles to that of the first named pivot, said second pivot connecting said link with said wobbler, a movable member, and a third single-axis pivot connecting said movable member with said link, the third pivot having its axis parallel with that of the first named pivot.

2. A mechanical movement comprising a rotatable shaft, a wobbler, means operatively connecting said shaft and wobbler, a non-rotatable support spaced outwardly from the periphery of said wobbler, a link extending from said periphery of said wobbler to said support, a single-axis pivot connecting said link with said support and having its axis disposed perpendicular to the shaft axis, a second single-axis pivot connecting said link with said periphery of said wobbler, said second pivot being perpendicular to the wobbler axis and at right angles to the axis of the first named pivot, a movable member, and a third single-axis pivot connecting said movable member with said link, said third pivot having its axis parallel with the axis of the first named pivot.

In testimony whereof I have hereunto affixed my signature.

ALBERT ANDREWS.